United States Patent
Johns et al.

[11] 3,979,953
[45] Sept. 14, 1976

[54] MASS FLOW METER FOR CRYOGENIC FLUID

[75] Inventors: Douglas A. Johns, Lantana; Gilbert Halverson, West Palm Beach, both of Fla.

[73] Assignee: Scientific Instruments, Inc., Lake Worth, Fla.

[22] Filed: May 12, 1975

[21] Appl. No.: 576,351

Related U.S. Application Data

[63] Continuation of Ser. No. 454,261, March 25, 1974, abandoned, which is a continuation of Ser. No. 251,743, May 9, 1972, abandoned.

[52] U.S. Cl............................ 73/194 M; 73/231 M
[51] Int. Cl.² ........................................ G01F 1/86
[58] Field of Search ......... 73/194 R, 194 M, 205 D, 73/231, 231 M, 233; 235/151.34, 92 DM, 92 FL, 194

[56] References Cited
UNITED STATES PATENTS

| | | | |
|---|---|---|---|
| 3,425,274 | 2/1969 | Clement et al.................... | 73/194 M |
| 3,537,312 | 11/1970 | Moore............................... | 73/231 M |
| 3,666,928 | 5/1972 | Burke et al. ...................... | 235/151.34 X |

Primary Examiner—Richard C. Queisser
Assistant Examiner—John P. Beauchamp

[57] ABSTRACT

A mass flow meter including a fluid volume indicating means for measuring the volume of a fluid, a temperature sensor for indicating the temperature of the fluid being measured by the fluid volume indicating means, a density compensator connected to the volume indicating means and the temperature means to provide an indication of mass flow rate of the fluid material, and counting means to accurately accumulate the indication of mass units to provide the total mass of the fluid being measured. The signal output of the volume indicating means and the temperature sensor from the temperature sensor provide input pulses to the variable pulse width means in the density compensator to initiate an output measuring envelope pulse and to cut off the output measuring envelope pulse. The envelope pulse is an input density compensated envelope pulse to the counting means. The density compensator includes an oscillator producing a high frequency output to the counter means. The counter accumulates through the output of the density compensator the mass flow data to provide an indication of total mass of the fluid measured.

4 Claims, 3 Drawing Figures

MASS FLOW METER FOR CRYOGENIC FLUID

This is a continuation of application Ser. No. 454,261, filed Mar. 25, 1974, now abandoned, which is a continuation of application Ser. No. 251,743, filed May 9, 1972, now abandoned.

BACKGROUND OF THE INVENTION

This invention relates to a new and improved means for determining the mass of fluid passing through a conduit in a fluid system, and, more particularly, to a single phase mass rate indicator of a liquid passing through a particular conduit including a new and improved density compensator and a counting means.

As is perhaps well known, turbine and other types of volumetric flow meters have been used to measure the rate of fluid passing through a conduit. The angular speed of the turbine is determined by the fluid flow rate, and therefore the angular speed of the turbine indicates the fluid flow rate. Such volumetric flow meters are calibrated to read directly in volumetric units. When the fluid being measured has a constant density, such volumetric flow meters can be calibrated directly in terms of mass units. When the density is a variable, the mass units cannot be calculated directly from the angular speed of a turbine. Most fluids decrease in density as the temperature increases. Therefore, the mass flow may be obtained by calculating the volumetric flow, measuring the temperature of the fluid, calculating the density of the fluid at the particular temperature, and multiplying the volumetric flow by the ratio of density at the fluid temperature to the density at a particular reference temperature. The ratio of the density at the fluid temperature to the density at the reference temperature is called the density compensation factor.

BRIEF DESCRIPTION OF THE INVENTION

The present invention is related to a new and improved fluid mass indicator including a density compensator means. The density compensator means is connected to a fluid volume indicator means for indicating the fluid volume, and a temperature sensor is placed adjacent said fluid volume indicator means for indicating the temperature of the fluid. The fluid volume indicator means and the temperature sensor provide input signals to the density compensator means. The density compensator includes an oscillator and a variable pulse width means. The fluid volume indicator means is connected to the variable pulse width means to initiate an output envelope pulse. The temperature sensor is connected to the variable pulse width means to control the width of the envelope pulse by controlling the shut off point of the envelope pulse. The output of the variable pulse width means and the constant cyclic output of the oscillator are connected to a binary counter to provide the total number of units of mass passing through the volume flow means. The binary counter counts the cyclic output of the oscillator during the time the binary counter receives the envelope pulse.

It is an object of this invention to provide a noncomplex mass flow meter for measuring a single phase fluid of varying density.

Another object of this invention is to provide a density compensator means for a fluid volume indicating means and a temperature sensor means.

Another object of this invention is to provide an efficient battery operated mass flow meter.

A further object of this invention is to provide a portable mass flow meter for trucks pumping cryogenic fluids.

In accordance with these and other objects which will be apparent hereinafter, the instant invention will now be described with particular reference to the accompanying drawing.

DESCRIPTION OF A PREFERRED EMBODIMENT

Figure 1:
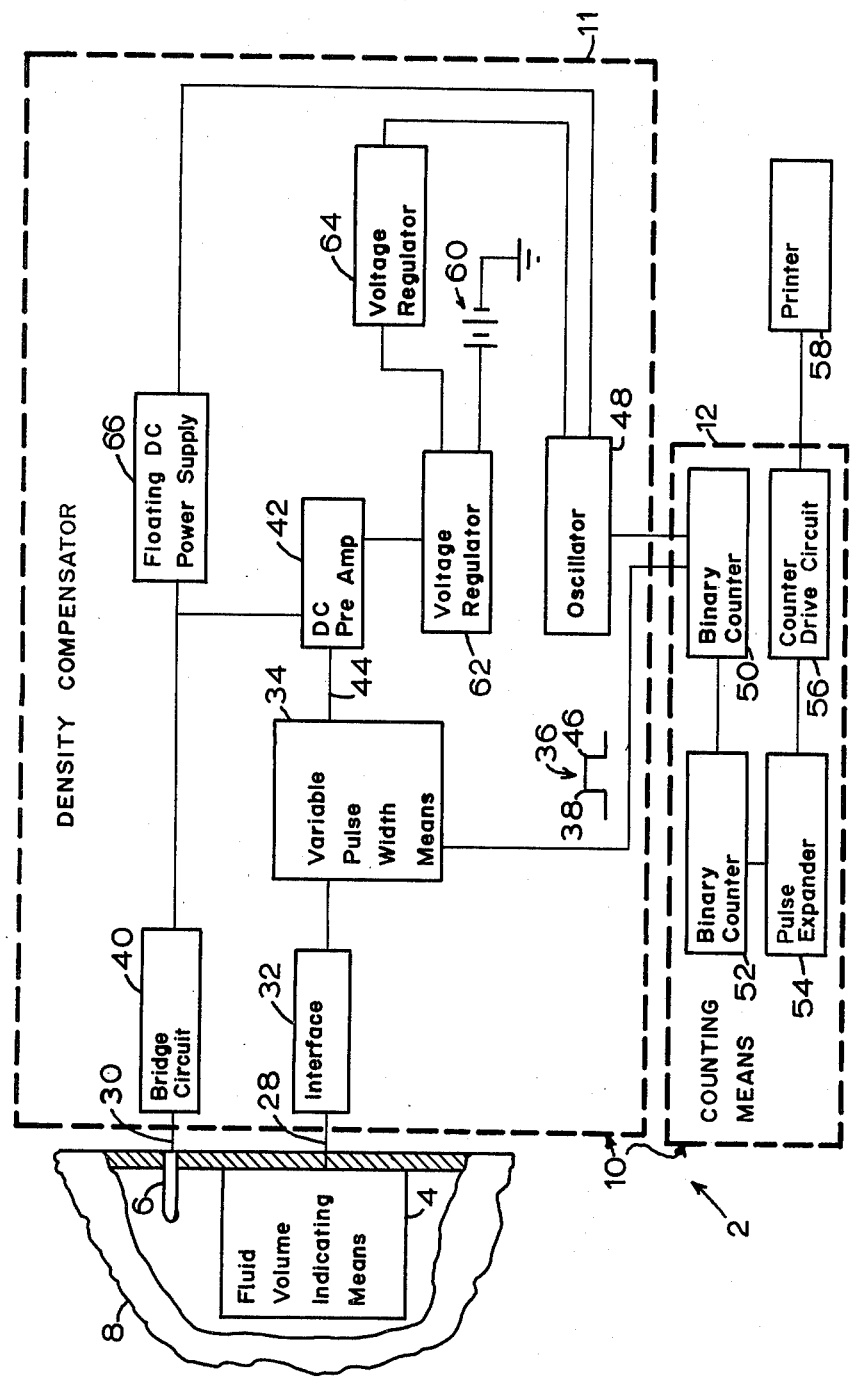
FIG. 1 is a block diagram of the mass flow meter.

Referring now in detail to the drawing, wherein an embodiment of the invention is shown, and, referring particularly to FIG. 1, the mass flow meter, generally designated by numeral 2 includes a fluid volume indicating means 4 and a temperature sensor 6 in a fluid conduit 8 connected to a density compensator means 10. The density compensator means 10 includes a density compensator 11 and counting means 12. The mass flow meter 2 includes the fluid volume indicating means 4 for measuring the volume of the fluid passing through conduit 8, the temperature sensor 6 for indicating the temperature of the fluid being measured by the fluid volume indicating means 4. The density compensator means 10 is connected to the volume indicating means 4 and the temperature means 6 to provide an indication of the mass flow rate of the fluid material. The signal output of the volume indicating means 4 and the temperature signal from the temperature sensor 6 provide input pulses to the density compensator 11 to provide a measuring envelope output pulse and a high frequency output to the counter means 12. The counter accumulated the mass flow data in the density compensator outputs to provide an indication of the total mass of the fluid measured.

Figure 2:
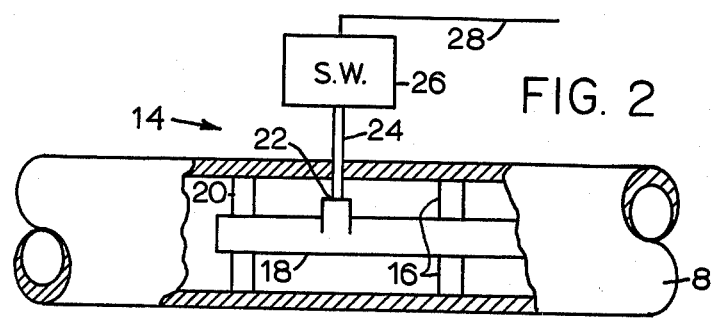
FIG. 2 is a side view of a turbine means.

The fluid volume indicating means 4 may be any ordinary turbine meter means 14, as shown in FIG. 2. The volume meter means has turbine blades 16 connected to shaft 18 supported by members 20 in the conduit 8. The shaft 18 includes a cam 22 that actuates a cam follower 24. The cam follower 24 triggers the electrical switching means 26. Switch 26 initiates at least one pulse for each revolution of the shaft 18. The signal is transferred over line 28 to the density compensator 11. The temperature sensor 6 produces a signal that is transmitted over line 30 to the density compensator 11.

The density compensator 11 includes an interface or input filter means 32 between the fluid volume indicating means 4 and variable pulse width means 34 in order to initiate the system pulse measuring envelope pulse, or density compensator envelope pulse as shown at 36. The signal from the fluid volume indicator means 4 initiates pulse 36 as indicated by numeral 38. The temperature sensor 6 is connected to a bridge circuit 40 by line 30 having an output connected to DC preamplifier 42 in order to condition and forward a signal over line 44 to the variable pulse width means 34. The termination of pulse 36 as indicated by numeral 46 is therefore controlled by the temperature signal from sensor 6.

The pulse width of envelope 36 determines the number of oscillator cycles from oscillator 48 that are accumulated and counted by counting means 12. The binary counter 50 will produce an output pulse when a fixed number of cycles have been accumulated within its registers. The output pulse is forwarded to a second binary counter 52 for producing an output pulse when a fixed number of pulses from counter 50 have been accumulated within its registers. The output pulse from counter 52 may be forwarded to additional binary counters. The output pulse from counter 52 is forwarded to the pulse expander 54. The pulse expander 54 prepares an output pulse to drive counter drive circuit 56. The counter drive circuit may be used to drive a numbered dial or printer 58 for visually indicating the mass flow of fluid through the fluid conduit 8.

Figure 3:
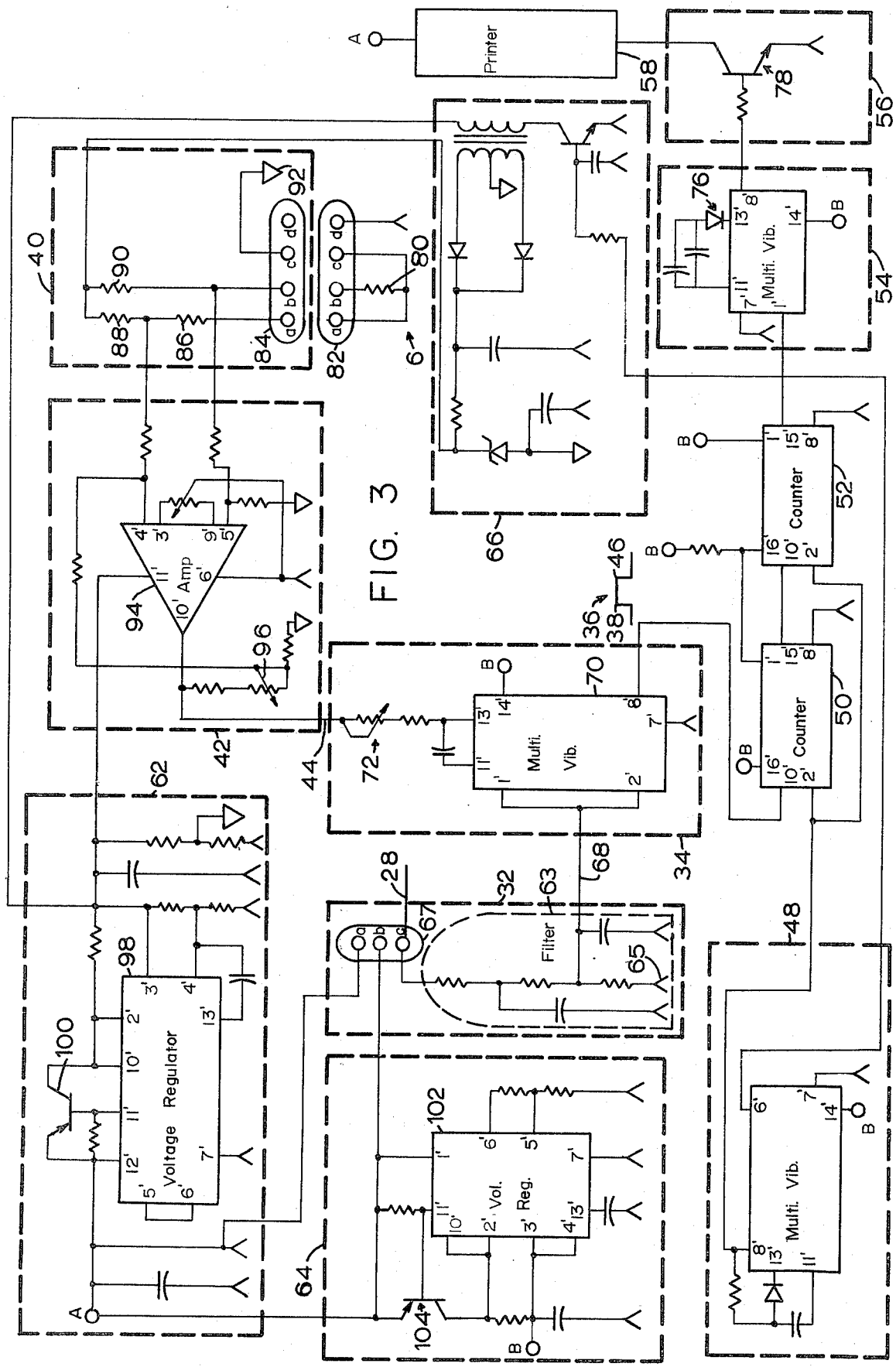
FIG. 3 is a detailed diagram of the density compensator.

Referring now to FIG. 3, the interface 32 includes filter 63 with a capacitor resistor network connected to the negative terminal of the battery 60 as indicated by numeral 65. The interface 32 also includes jack 67. The jack 67 is connected to the fluid volume indicating means 4 by line 28. Interface 32 is connected to voltage regulators 62 and 64. The battery 60 is also connected across jack terminals a and b, not shown. The interface 32 is connected to the variable pulse width means 34 by line 68. The filter 63 is connected to the multi-vibrator or retriggerable one shot 70. The vibrator 70 is a triggering means that initiates pulse 36 as shown by numeral 38. The variable pulse width means 34 also triggers the end the pulse as shown at 46. The temperature signal from temperature sensor 6 passes through bridge circuit 40, D.C. pre amp 42 over line 44 to the cutoff trigger means shown at 72. The multivibrator 70 is connected to the system by connecting the standard terminals 1', 2', 7', 8', 14', 13', and 11' of the multivibrator into the system as illustrated.

The output of the variable pulse width means 34 is connected to the binary hex decimal counter 50 which is connected into the system by connecting the standard terminals 10', 16', 1', 15', 8', and 2' of the counter into the system as illustrated. The counter 50 is connected to counter 52, which is similar to counter 50, which is connected to the voltage regulator shown as an integrated voltage regulator, a dual inline package, through B. The counters 50 and 52 and the multivibrator 74 are connected through a resistor, not shown, to the battery through B. Terminals 11' and 13' of the multivibrator 74 are connected to timing circuit 76. The multi-vibrator is connected to the counter drive circuit 56 which includes the NPN drive transistor 78. The counter drive circuit 56 is connected to printer 58 that is connected to battery 60 at A.

The temperature sensor 6 including resistor means 80 is connected to jack 82. Jack 82 is connected to the matching jack 84 that connects resistor 80 into the bridge circuit 40. Jack 84 is also connected to a common ground such as a floating ground at 92. Resistors 80, 86, 88 and 90 are interconnected, as shown, to form bridge circuit 40. The output of the bridge cricuit 40 is connected to the DC preamplifier 42 that includes an integrated circuit operational amplifier 94. A manual preset variable resistor 96 is included to allow adjustment of the device for determining mass of various types of liquid materials. The amplifier 94 is connected to the voltage regulator shown as an integrated voltage regulator, that is, a dual inline package 98. The jack mark A is connected to the battery 60. The driver transistor 100 is a PNP type.

The oscillator 48 is connected to the binary counter 50 in the binary counter 12. The oscillator 48 is connected to the floating DC power supply 66 including NPN drive transistor and a transformer. The floating DC power supply 66 is connected to voltage regulator 64 and to the bridge circuit 40.

For successful operation of the meter under environmental and physical conditions encountered in truck delivery of cryogenic materials, the supply voltage parameter is ± 4.5 volts in order to operate off a standard 12 volt battery. In order to operate, when the input signal is from a bridge circuit, there must be high input impedance, differential input, high common mode and normal mode rejection, an input offset voltage less than 1 millivolt, and input offset current less than 1 nanoampere. To operate over extreme temperature conditions, the following parameters must be met; capacity of operating over a temperature range of 55°C to + 125°C, average temperature coefficient of input offset voltage less than 5 microvolts per centigrade, and average temperature coefficient of input offset current less than 10 picoamperes per centigrade.

It should be noted that the integrated circuit operational amplifier 94 may be Raytheon unit Number RM 4132DI.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A fluid temperature compensation meter comprising;
   a fluid volume sensing means to produce a first output pulse signal for measuring the volume of the fluid to be measured,
   a temperature sensor connected adjacent said fluid volume sensing means to produce a second output signal for measuring the temperature of the fluid to be measured,
   a compensator connected to said fluid volume sensing means to provide a first input into said compensator and to said temperature sensor to provide an additional input to said compensator to correct the measured first input signal to provide liquid mass flow data, said compensator including an output,
   a signaling means connected to said output of said compensator to indicate the mass of the fluid measured, and
   said compensator including a variable pulse width generating means connected to said fluid volume sensing means to produce pulses in synchronism with said output pulse signal of said fluid volume sensing means and connected to said temperature sensor to control the width of said volume sensing means output pulses to provide density compensating envelope pulses.

2. A fluid temperature compensation meter as set forth in claim 1 wherein;
   said compensator includes an oscillator for producing a cyclic oscillator pulse output,
   a counter connected to said oscillator and to said variable pulse width generating means to receive controlled density compensating envelope pulse and the cyclic oscillator pulses for the period of said density compensating envelope pulse, and said temperature sensor is a cryogenic sensor and said fluid volume sensing means is a cryogenic fluid volume sensing means.

3. A fluid temperature compensation meter as set forth in claim 2 wherein;
said temperature sensor including a bridge circuit,
said variable pulse width generating means connected to said bridge circuit for providing a time varying pulse cutoff signal to vary the length of the density compensating envelope pulse output for obtaining accurate mass determination.

4. A fluid temperature compensation meter as set forth in claim 1 including;
a counter means connected to said output of said compensator.

* * * * *